(No Model.) 3 Sheets—Sheet 1.

J. H. ELWARD.
PLANTER.

No. 373,226. Patented Nov. 15, 1887.

Witnesses:
J. C. Turner
J. L. Doubleday

Inventor:
John H. Elward
By Doubleday & Bliss
attys (No Model.) 3 Sheets—Sheet 2.
J. H. ELWARD.
PLANTER.
No. 373,226. Patented Nov. 15, 1887.
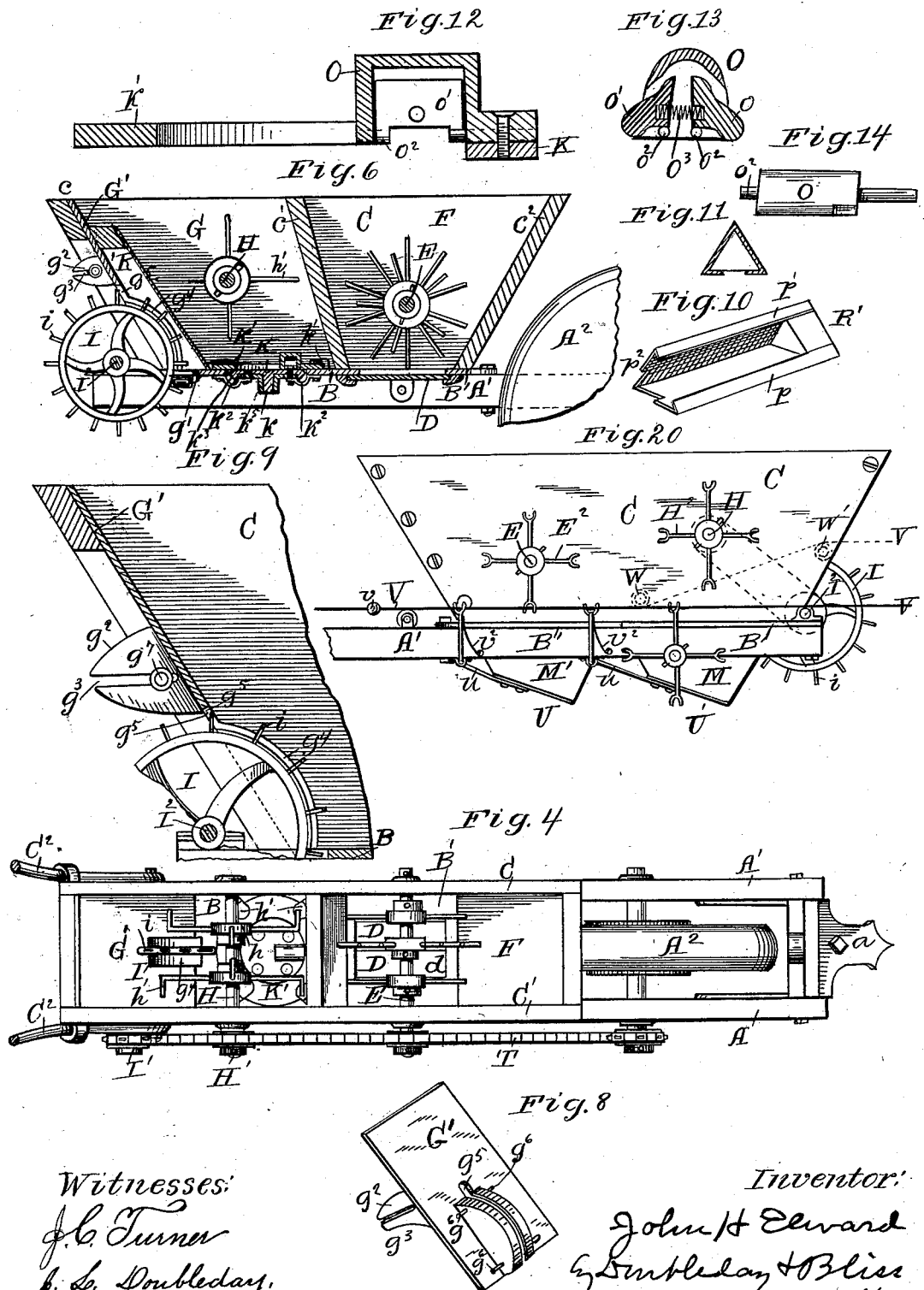

(No Model.) 3 Sheets—Sheet 3.
J. H. ELWARD.
PLANTER.
No. 373,226. Patented Nov. 15, 1887.
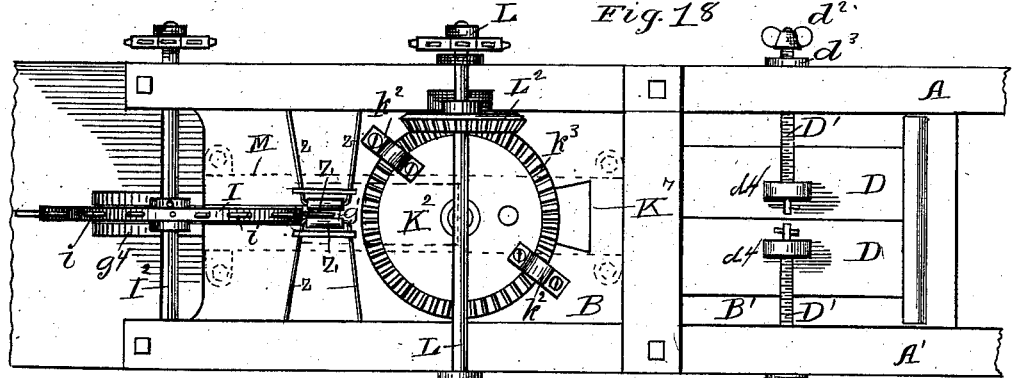
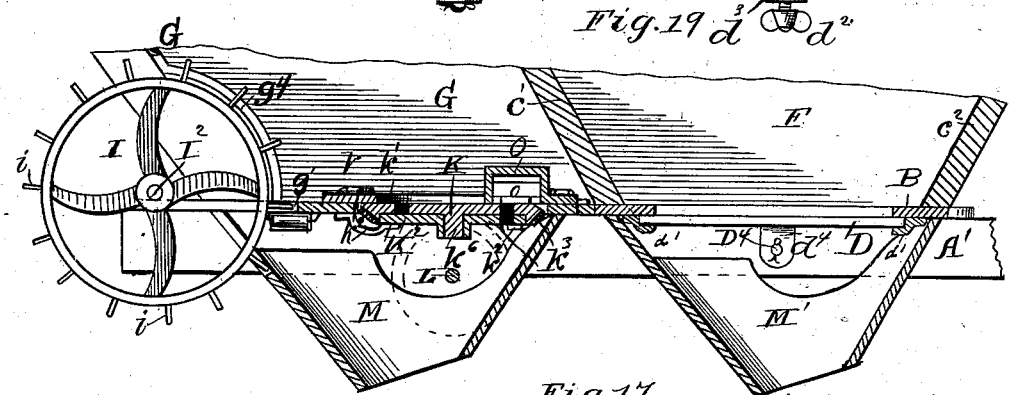
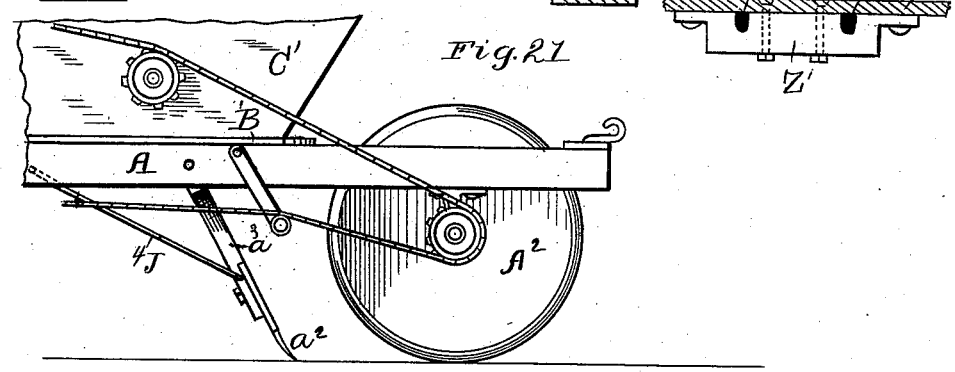
Witnesses:
J. C. Turner,
J. L. Doubleday.
Inventor:
John H Elward
by Doubleday & Bliss
attys.

UNITED STATES PATENT OFFICE.

JOHN H. ELWARD, OF ST. PAUL, MINNESOTA.

PLANTER.

SPECIFICATION forming part of Letters Patent No. 373,226, dated November 15, 1887.

Application filed January 4, 1887. Serial No. 223,354. (No model.)

*To all whom it may concern:*

Be it known that I, JOHN H. ELWARD, a citizen of the United States, residing at St. Paul, in the county of Ramsey and State of Minnesota, have invented certain new and useful Improvements in Planters, of which the following is a specification, reference being had therein to the accompanying drawings.

Figure 1:
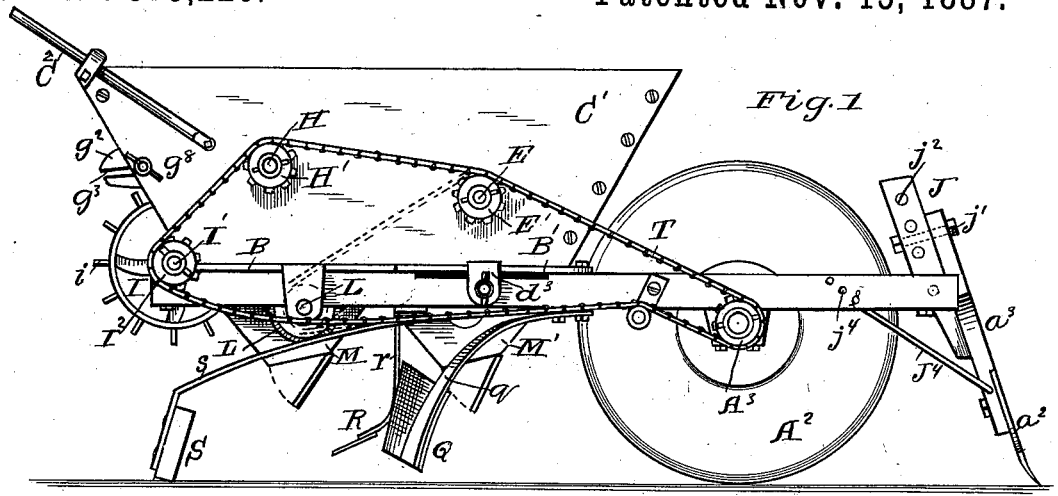
Figure 2:
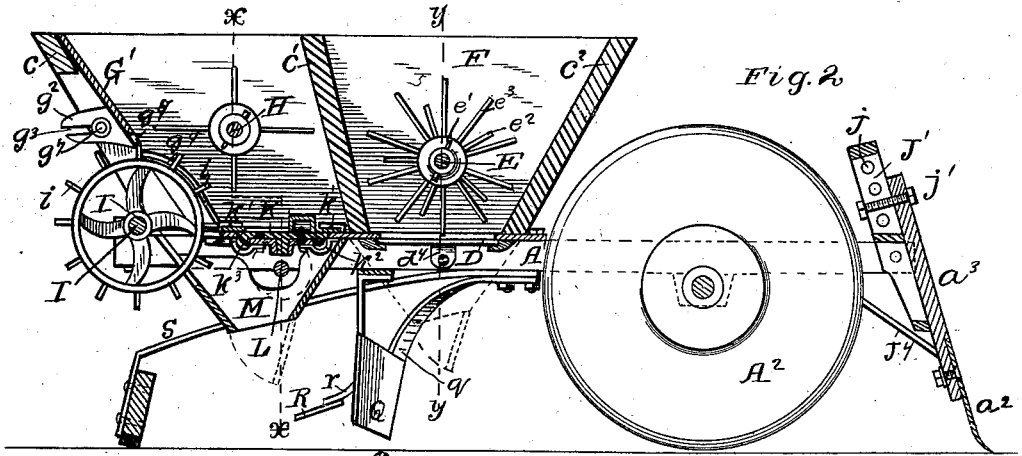
Figures 3, 5, 7:
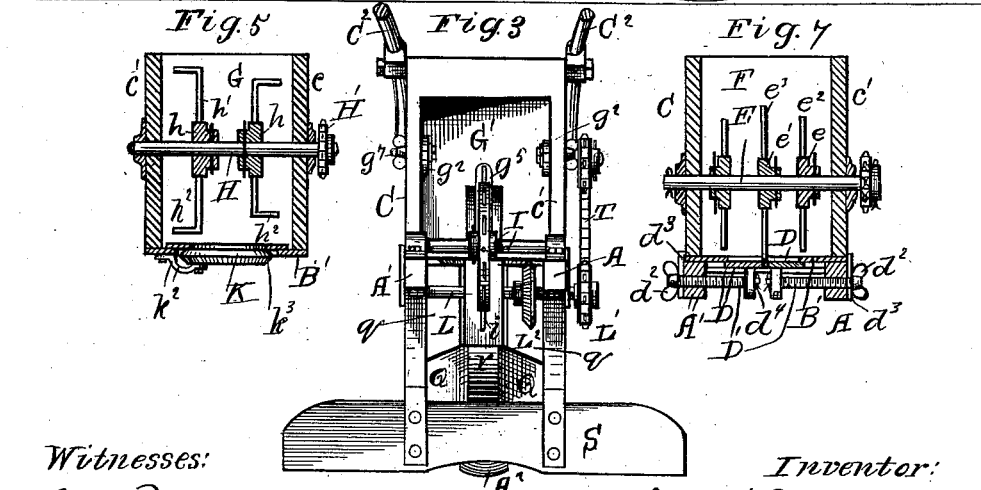

Figure 1 is a side view of the machine when the parts are arranged for planting cotton. Fig. 2 is a longitudinal section of the same. Fig. 3 is a rear view. Fig. 4 is a plan view. Fig. 5 is a partial section showing the devices by which the regulating of the feed of cotton-seed is effected. Fig. 6 is a section showing the parts used for planting corn. Figs. 7 to 19 show some of the details of the machine detached. Fig. 20 is a side view of the machine when the parts are arranged as a check-rower. Fig. 21 shows the front shovel and ground-wheel inverted in position.

This invention relates to improvements in machines for planting cotton-seed, corn, and other seed, and also for distributing the fertilizer which is to be applied to the soil.

It relates to improvements in the devices by which a constant or an intermittent depositing of the fertilizer can be attained, and also to those by which a continuous or an intermitting feed of the seed can be accomplished.

It relates, also, to improved adjusting devices for regulating the feed of the seed and also the distribution of the fertilizer.

It relates, further, to improved means for dropping both the fertilizer and seed at regular intervals by a check-row apparatus.

It relates, further, to devices for partially covering the fertilizer and packing and smoothing the soil upon it before the seed is deposited thereon.

It relates to other matters, which will be fully hereinafter described.

I will first describe the machine and the parts when they are so constructed and arranged that they can be driven from the wheel or wheels which support and carry the frame, and will subsequently describe the method of operating the mechanism with a check-row device.

In the drawings a main frame is shown consisting of side bars, A A', which can be joined by any suitable cross-pieces. I do not wish to be limited, however, to any specific form of framing.

As shown, the rear ends of the side bars are connected by the bottom plate, which supports the hoppers and the devices above. This plate may be continuous, or may be in two parts, B B'.

Above it there is arranged a hopper having two compartments, instead of which use may be made of two separate hoppers, if desired. That shown is formed of side plates or boards, C C', with transverse plates or boards $c\ c'\ c^2$, the end parts, $c\ c^2$, inclining inwardly somewhat. To the hopper portion the handles $C^2$ can be attached, as shown.

The front hopper or compartment, F, is used to carry the fertilizing material. The latter is discharged and distributed therefrom as follows: An aperture is formed in the bottom plate, B', and sliding plates D D are placed on the under side of the bottom plate, they being guided by means of cleats $d'$. The plates D D can be arranged to have a slot or passage-way, $d$, between them at the center of the hopper, the width of which can be regulated by sliding the plates. This is accomplished by means of adjusting-screws D', which pass through threaded hangers $d^3$ and loosely engage with lugs $d^4$, projecting downwardly from the plates D. At $d^2$ there are thumb-heads by which the screws D' can be turned to adjust the plates.

In order to cause the fertilizing material to constantly descend and to uniformly distribute it, I employ steering or agitating fingers, which are caused to move through the fertilizer.

E is a shaft mounted transversely of the hopper and carrying a sprocket-wheel, E', by which power is imparted.

$e\ e\ e'$ are hubs secured to the shaft, they carrying the fingers or agitators $e^2\ e^3$. The fingers $e^3$ on the central hub are longer than those at $e^2$ on the other hubs, so as to extend down to a point near the discharge-slot $d$.

The seed which it is intended should be planted is placed in the other compartment or hopper, G. This is provided with attachments by means of which two or more kinds of seeds can be planted without removing any material part—that is, seeds which require different manipulation or treatment while being planted—for instance, such as cotton on the one hand and corn on the other.

In planting cotton the following devices are used:

H represents a shaft extending transversely across the hopper G, it carrying a sprocket-wheel, H', on the outside.

$h\ h$ are hubs secured to shaft H, and each hub carries outwardly-extending arms $h'$, with laterally extending fingers $h^2$, the latter projecting alternately in opposite directions. By these the seeds are agitated so as to gradually and uniformly move downward to the discharge mechanism.

The feeding out of the hopper of the seed is effected mainly by the wheel I, mounted on a shaft, $I^2$, and carrying a sprocket-wheel, I'. This wheel I is provided with radially-projecting fingers $i$, and a portion of the fingers on the periphery of the wheel are always projecting through the rear wall, the latter having a slot at $g^5$ to permit their passage. The bottom B is formed with an aperture, $g'$, through which the seed is forced by the fingers $i$.

In order to provide an adjustment in respect to the discharge-aperture and in respect to the forcing-fingers, I so construct and arrange the parts at this point that one or the other of these can be decreased in size, so far as concerns the operative parts thereof, and thereby obviate serious difficulties which have been experienced with machines of this class as heretofore constructed.

The whole or the bottom part of the rear wall, G', is so arranged that it can be moved bodily inward and adjusted to any desired position. It is formed with lugs $g^2$, slotted at $g^3$, and in the slots are fitted set-screws or bolts $g^7$, the heads of which can be drawn tightly into place by thumb-nuts $g^8$. When the lower part of this wall G' is thus moved inward, the edges at $g^4$ of the slot $g^5$ are moved toward the ends of the forcing-fingers $i$, so that the operative parts of said fingers are shortened, and at the same time the aperture $g'$ in the bottom plate can be made smaller, so as to decrease the feed. In this respect the machine is superior to those heretofore used, in which the adjustment was effected in such way that the discharge-aperture was increased in size when the adjacent parts were moved into such position as to decrease the feed. The edges $g^4$ of the slot $g^5$ are formed on inwardly-projecting flanges, which more or less cover the sides of the wheel and prevent the material from coming in contact with them, and leaving only the fingers to project through.

The material that is forced through is received in a chute or hopper, M, from which it is dropped in the drill or hill, as the case may be, as shown in the figures now being described. The parts are so arranged that there is a constant feed of the fertilizer in advance of the dropping of the seed. Under many circumstances it is very objectionable to have the seed come into direct contact with the fertilizing material. With my construction this can be obviated when desired to do so.

At Q Q scrapers are shown, which act to draw more or less of the adjacent earth in to cover the fertilizer, which is dropped immediately ahead of them.

R represents a packer or slicker arranged directly above the drill and adapted to pack and smooth the earth which has been deposited on the fertilizer by the scrapers Q. This part R can be modified in construction. I prefer to construct it in the form of a backwardly-turned plate—that is, a plate having its operative face backwardly inclined, the one shown being carried by a spring-metal arm, $r$. The scrapers Q Q are supported on similar arms, $q$.

Immediately after the soil has been packed by the part at R the seeds are dropped, the parts being so arranged that there shall be a partial furrow left to receive them.

I am aware of the fact that heretofore use has been made of devices for drawing the earth over the fertilizer before the seeds are deposited; but the machines with which I am acquainted have all been so arranged that it is necessary to open a second furrow for the purpose of depositing the seed, and the fertilizer and seed hoppers were not arranged in respect to the supporting-wheels as are those in the present construction. In my case both receptacles are in rear of the supporting-wheel, and therefore the latter in nowise affects the furrow formed for the fertilizer and the seed, as is the case when the supporting-wheel is intermediate of the fertilizer-receptacle and the seed-receptacle, as heretofore, and a second furrow-opener has been required.

S represents the covering-bar, which finally fills the drill and covers the seed. This is carried by long spring-bars $s$, extending to the front end of the machine.

When seeds of another character are to be planted—as, for instance, corn—it is effected as follows:

P, Fig. 10, represents, generally, a cover adapted to be put in place over the above-described slot $g^5$ in the rear wall, G', and over the aperture $g'$ in the bottom. This cover may be made in any suitable way, though I prefer one substantially similar to that shown.

At $g^6$, Fig. 8, there is a guide and holder for the cover provided with pins, with which engages inwardly-turned lip $p'$ on the part P. At the lower end the cover is beveled, as shown at $p^2$, to fit tightly upon the bottom.

The corn or similar seed is delivered by means of a revolving plate, K, having apertures which successively register with an aperture, $k^3$, in a stationary plate, $K^2$. The revolving part K is held in place as follows:

K' is a ring resting upon the bottom of the hopper and covering somewhat the aperture in which the plate K is fitted—that is to say, the said plate lies under the ring and is held down by it, the ring being retained in place by clips $k'$.

Below the plate K is the stationary plate $K^2$, held in place by brackets $k^2$. It is formed with a downwardly-extending conical socket, $k^5$, into which fits a stud or projection, $k^6$, on the revolving plate K. With the plate K is formed, or to it there is attached, a beveled wheel or series of teeth, $K^3$. With these a wheel, $L^2$, engages, this being carried by a horizontal shaft, L, having sprocket-wheel L' on its outer end.

The cut-off device for regulating the escape of the seed is formed with a cover, O, having a projecting flange, O', which is fastened to the ring K'. Within this are mounted two cut-offs, $o\ o'$, they being pivoted at $o^2$ in the ends of the covering part. Between the upper parts of the cut-offs there is a spring, $O^3$, which acts to hold them in their normal position, but permits them to yield for the passage of seed beneath them. The regulating is effected in whichever direction the plate K revolves, there being one of the aforesaid cut-offs on each side, as shown.

It will be seen that when the shaft L is rotated the seed will be delivered through the plates K and $K^2$ and dropped into the hopper M, the aperture $g'$ being at this time closed.

$A^2$ represents the main supporting-wheel, on which the machine is carried, its axle being provided with a sprocket-wheel, $A^3$.

T is a sprocket-chain adapted to carry power from the wheel $A^3$ to the above-described devices. When it is desired to feed cotton-seed together with fertilizing material, the chain T is passed around the wheels E', H', and I', it being disengaged from the wheel L'. At such times the distributer at K is stationary, and the aperture $g'$ is open and the force-wheel I rotates; but when seed of a different character is to be planted the chain is removed from the wheel I' and passed around the wheel L', the cover P at this time being in place, as above described.

At the front end of the machine there is a shovel, $a^2$, adapted to loosen the soil and open the drill. It is carried by a standard, $a^3$, which is adjustable upon the bracket J, the latter being pivoted to the front ends of the beams A A' and being slotted at J'. In the slot fits a bolt, $j'$, by which the standard can be clamped after adjustment.

At $j^2$ there are apertures for the adjustment of the clevis. By examining Fig. 20, which is taken from the opposite side of the machine, it will be seen that the planter is so constructed that it can be used in combination with check-row devices.

$E^2$ represents a wheel or hub on the end of the shaft E, $L^2$ a similar wheel or hub on the shaft L, and $H^2$ another on the shaft H, each of these wheels being provided with tripping devices of any of the usual styles, those shown consisting of radial arms having forked fingers.

U U' represent valves or hinged bottoms, which act as cut-offs for the hoppers M M'. These valves or cut-offs are carried by vibrating levers $u\ u'$, journaled at any suitable point, preferably beneath the longitudinal beam of the frame. These also have forked fingers at their upper ends.

When the machine is to be used for the planting of corn, the wheel $H^2$ is removed and the wheel $L^2$ is put in place, and a cord or wire, V, knotted or jointed, as at $v$, is used in connection with the other devices in the ordinary way—that is to say, as the machine advances the knots or joints $v$ come in contact first with the lever $u$, thereby opening the valve U, then in contact with the arms on wheel $E^2$, causing more or less of the fertilizer to drop into the closed hopper for the next hill, then into contact with the lever $u'$, thereby opening the hopper M and allowing the seed to drop at the place where an instant before dropped the fertilizer, and then in contact with one of the forked arms of the wheel $H^2$, thereby partially revolving the seed-dropper in order to deposit in the hopper the corn requisite for the succeeding hill. The above-described scrapers and packer can be employed, if desired, intermediate of the dropping of the fertilizer and the dropping of the corn to partially cover the former.

When the machine is to be used for planting cotton, the wheel $L^2$ is removed or thrown out of action and the wheel $H^2$ is brought into action. In practice I prefer to employ but a single wheel, adapted for use either upon the shaft L or upon the shaft H, which can be used interchangeably on said shafts.

At W there is a guide-roller by which the cord or wire can be deflected after engaging with the lever $u'$ and be taken in such direction as to engage with the arms on shaft H, causing it to turn sufficiently for the purposes above described. This shaft is connected to the force-feed shaft by a chain, (indicated by dotted lines in Fig. 20,) this chain running from the above-described wheels H' to the wheel I' on the opposite side of the machine. This chain therefore causes the feed mechanism to deposit in the hopper the cotton-seed necessary for the next planting. At W' there is shown another guide-roller, by which the cord or wire is again deflected from the machine.

It will be readily understood that in numerous respects the manner of guiding the cord or wire to the various parts which it moves can be modified, as many ways will suggest themselves to those acquainted with such machines whereby the ends above set forth can be attained—that is to say, whereby the described series of steps can be performed, comprising the dropping of a certain amount of fertilizer, depositing another amount in the hopper, dropping a quantity of the seed upon the fertilizer, and agitating or stirring the seed in the main receptacle, if necessary, these steps being accomplished either in the series described or in any other which is similarly advantageous.

The balls or knots $v$, in conjunction with the forked arms on the feeding devices and on the cut-offs or valves, constitute the means whereby power is transmitted from the cord or wire V to the said feed devices, although, as numerous means for thus transmitting power are well known at this day, there can be modification, if desired, in respect to the form shown.

At $u^2$ springs are shown adapted to hold in normal position the valves U U'. When the machine is operated to deposit continuously in drills the fertilizer and the seed, by using the chain T, as first above described, the valves U U' can be dropped down or swung up away from the bottoms of the hoppers, so as to leave them open.

The cotton-seed is pressed downward by the fingers $i$ between cut-off rollers Z Z. These are mounted so as to yield downwardly on spring-holders $z$. The latter are preferably formed of wires bent, as shown, into a U shape. The ends are secured in any suitable way. In Fig. 18 they are shown as being fastened to the sills A A'. I prefer, however, to employ clamps, such as those at Z', Figs. 15, 16, and 17, these having apertures or grooves to receive the springs and formed with corrugations, as at $i^2$, to grip the wires. Guides are also provided to hold them properly, and these can be formed also in the clamp-pieces Z', as shown at $z'$, the guide parts being prolongations of the clamping-grooves and of greater depth, as shown.

By employing a U-shaped spring or its equivalent it will be seen that I provide a bearing for each end of each roller, each of the legs $z$ of the springs acting as such a bearing for one of the ends of a roller. It will be also seen that the springs $z\ z$ are so arranged that both ends of each roller can vibrate together in the same horizontal lines—that is to say, as one end goes down the other goes with it, and they are at all times in the same lines horizontally, in contradistinction to their being suspended in such way that one end must swing down farther than the other, as is the case when the rollers are provided with a spring-bearing at one end only of each. By arranging the fastening devices of the springs laterally opposite to the passage-way in the bottom of the hopper the rollers are prevented from being thrust out to either side and are caused to swing uniformly down and up. There can be more or less modification in this method of supporting the rollers.

While I prefer the relative positions shown of the hopper G, the wheel I, and the rollers Z, yet they can also be varied somewhat; but the arrangement shown is advantageous, as the fingers $i$ act (in conjunction with rollers Z) at that place in their path where they are most effective—that is to say, in or nearly in the horizontal plane of the axis of the wheel, the rollers being situated in a plane above the lower part of the path of the teeth.

The agitating devices both in the fertilizer-receptacle and in the seed-receptacle are detachable, to permit of variations in the feeding of the material in the receptacles. The hubs $h$ and $e\ e'$ are fastened by pins to their shafts, so that they can be readily removed to permit the use of others. By examining Figs. 4 and 5 it will be seen that the arms $h'$ are so arranged that the inwardly-turned fingers $h^2$ alternately project toward the walls C C' and toward the center of the receptacle, and that those which turn toward the center are on shorter radii. This enables me to have the agitating devices approach closely to the feed-wheel I and also the back wall, G'.

The seed-distributing devices in the bottom can be readily removed to permit the insertion of others of different capacity. The plate K is held loosely in place by the fastener K', which latter, though preferably of the form of a ring, held in place by vibrating clips, can be secured by any other detachable fastener. This ring is held in place by means of a dove-tailed projection or offset on the under side integral therewith or fastened thereto at $K^6$. The bottom plate, B, of the receptacle has a dovetailed aperture or recess at $K^7$ to receive this offset.

By examining Fig. 21 it will be seen that the shovel $a^4$ can be placed behind the carrying-wheel $A^2$. In order to hold the shovel properly to work and prevent it from being clogged by stubble or trash, I combine with it a brace, $J^4$, which extends rearwardly, it being pivotally connected with the shovel and adjustably fastened to the sill in apertures at $j^4$.

I am aware of the fact that heretofore use has been made of planters having two sets of devices for delivering material, they being generally intended for simultaneously delivering a fertilizer and of delivering seed of one character or another; but, so far as I am aware, the said two sets of mechanism have not been independent of each other, as is the mechanism herein for feeding cotton and the mechanism herein for feeding corn; but in the earlier machines they have their operative parts so united together that when one set was in operation the other was also. In my case the cotton-planting and the corn planting devices are independent, in the sense of being adapted to be alternately put into and thrown out of operation, although they are related to each other when the machine as a whole is considered as a new and useful implement for these purposes.

I do not herein claim any of the combinations set forth in the claims in my application No. 249,767, filed September 15, 1887, as a division hereof, and reserve the right to claim therein the patentable features therein shown and described and not herein claimed.

What I claim is—

1. A planting mechanism having a main frame, a seed-hopper secured to said frame, a cotton-seed-feeding mechanism situated in one part of said hopper, and a corn-feeding mechanism having all of its parts independent of the cotton-seed-feeding mechanism and situated in another part of the said hopper, the said seed-feeding mechanisms being each adapted to have all of the parts thrown out of action when the other is operating, substantially as described.

2. A planting mechanism having a main frame, a seed-receptacle, a vertically-revolving force-feed wheel for cotton-seed, and a horizontally-revolving corn-dropping wheel supported and operated entirely independently of the cotton-seed-feeding wheel, all of the aforesaid parts being secured together permanently in position and arranged substantially as set forth, whereby the seed-receptacle is adapted to supply both seeding-wheels in common, and each of said seeding-wheels being adapted to be operated when the other is thrown out of action, substantially as described.

3. A planting mechanism having a main frame, a seed-receptacle, a fertilizer-receptacle independent of the seed-receptacle, two independent seed-feeding wheels, and a fertilizer-distributer supplemental to the seed-feeding wheels and adapted to be used with either of them after the other is thrown out of action, all of said parts being secured together permanently in position, substantially as set forth.

4. The combination, with the hopper or receptacle having an escape-passage for the material, of the agitating devices having the shaft, the detachable hubs secured by pins, and the radially-extending stirring-arms, substantially as described.

5. The combination, with the seed-receptacle and the feed-forcing mechanism, of the agitating devices mounted on a shaft transverse to said wheel and having stirring-arms arranged to revolve by the sides of said wheel and other stirring-arms arranged to revolve in the planes of revolution of the said wheel, all of the said stirring-arms being arranged at right angles to said shaft, substantially as set forth.

6. The combination of the main frame, the supporting-wheel, the fertilizer-receptacle, the seed-receptacle behind the fertilizer-receptacle and both behind the supporting-wheel, the fertilizer-distributer, the seed-dropping mechanism, and the earth-packer having its operative face backwardly inclined, arranged, substantially as set forth, to act intermediately of the fertilizer and the seed-dropper, substantially as set forth.

7. The combination of the main frame, the fertilizer-distributer, the seed-dropping mechanism, the scrapers Q, and the earth-packer R, having its operative face backwardly inclined, both the said packer and the said scrapers mounted upon yielding supports and arranged intermediately of the fertilizer-distributer and the seed-dropper, substantially as set forth.

8. In a cotton-planter, the combination of the fertilizer-receptacle F, the fertilizer-distributing devices, the earth-scrapers Q, the seed-receptacle G, the revolving agitating-arms $h'$ inside the seed-receptacle, the feed-forcing wheel I, mounted on a shaft outside the seed-receptacle, the hopper or chute M, and a spring-actuated coverer, S, behind the hopper or chute M, substantially as set forth.

9. The combination of the fertilizer-receptacle, the intermittingly-movable valves below said receptacle, the seed-receptacle, the intermittingly-moving valve below the same, the fertilizer-agitator, the seed-dropping mechanism, and the cord or wire which successively actuates the said devices, substantially as described.

10. In a planter, the combination, with the frame and the supporting-wheel, of the opening-shovel $a^2$, the standard $a^3$, the slotted bracket J, pivoted to the frame and adapted to have the shovel-standard and the clevis both vertically adjustable thereon, and the rearwardly-extending brace, substantially as set forth.

11. In a planter of the character described, the combination of the receptacle F, the intermittingly-acting cut-off U, the receptacle G, the intermittingly-acting cut-off U', and the cord or wire V, adapted to intermittingly engage with the said cut-offs U and U', substantially as described.

12. In a planter of the character described, the combination of the receptacle F, the intermittingly-acting cut-off U, the receptacle G, the intermittingly-acting cut-off U', the intermittingly-acting agitating devices in receptacle F, and the cord or wire V, adapted to intermittingly engage with the said cut-offs and agitating devices, substantially as set forth.

13. In a planter of the character described, the combination of the receptacle F, the intermittingly-acting cut-off U, the receptacle G, the intermittingly-acting cut-off U', the cord or wire V, the seed-feeding devices, and means, substantially as described, for transmitting power from the cord V to said feeding devices, substantially as set forth.

14. The combination, with the receptacle for cotton and other seed, having an escape-passage for the cotton-seed, a passage for the feed-forcing devices, and a supplemental escape-passage for other seed, of a cover, R', adapted to close the said passages for cotton-seed and for the feed-forcing mechanism, substantially as set forth.

In testimony whereof I affix my signature in presence of two witnesses.

JOHN H. ELWARD.

Witnesses:
JESSIE B. SALISBURY,
J. A. PARTRIDGE.